(12) United States Patent
Neubauer et al.

(10) Patent No.: US 11,213,951 B2
(45) Date of Patent: Jan. 4, 2022

(54) COMPUTER-ASSISTED ASCERTAINMENT OF A MOVEMENT OF AN APPARATUS

(71) Applicant: Siemens Aktiengesellschaft, Munich (DE)

(72) Inventors: Werner Neubauer, Munich (DE); Philipp Sebastian Schmitt, Munich (DE)

(73) Assignee: SIEMENS AKTIENGESELLSCHAFT

( * ) Notice: Subject to any disclaimer, the term of this patent is extended or adjusted under 35 U.S.C. 154(b) by 288 days.

(21) Appl. No.: 16/412,086

(22) Filed: May 14, 2019

(65) Prior Publication Data

US 2019/0351551 A1 Nov. 21, 2019

(30) Foreign Application Priority Data

May 17, 2018 (EP) ..................... 18172937

(51) Int. Cl.
B25J 9/16 (2006.01)

(52) U.S. Cl.
CPC ........... *B25J 9/1666* (2013.01); *B25J 9/1664* (2013.01); *B25J 9/1676* (2013.01)

(58) Field of Classification Search
CPC ...... B25J 9/1666; B25J 9/1676; B25J 9/1602; B25J 9/1605; B25J 9/1607; B25J 9/1628;

(Continued)

(56) References Cited

U.S. PATENT DOCUMENTS 8,660,694 B2 2/2014 Lurz et al.
2009/0271035 A1 10/2009 Lurz et al.

FOREIGN PATENT DOCUMENTS

| CN | 105717869 A | 6/2016 |
|---|---|---|
| CN | 105751196 A | 7/2016 |
| DE | 102008057142 B4 | 11/2009 |

OTHER PUBLICATIONS

Kuan, et al. "A New Time-Efficient Trajectory Planning Solution for Humanoid Robot Arms", Dec. 2007, IEEE International Conference on Robotics and Biomimetics, pp. 312-317 (Year: 2007).*

(Continued)

*Primary Examiner* — Spencer D Patton
(74) *Attorney, Agent, or Firm* — Schmeiser, Olsen & Watts LLP

(57) ABSTRACT

Provided is a computer-assisted method for ascertaining a movement of an apparatus, which has a tool that is movable by way of translational and/or rotational axes of movement of the apparatus, includes the following method steps: a first movement trajectory of the tool is ascertained in a first configuration space. A predetermined parameter of a movement of the tool is optimized when ascertaining the first movement trajectory. A check is carried out as to whether the first movement trajectory satisfies at least one predetermined first boundary condition. A second movement trajectory of the tool in a second configuration space is ascertained by transforming the first movement trajectory into the second configuration space if the first movement trajectory satisfies the predetermined first boundary condition. A check is carried out as to whether the second movement trajectory satisfies at least one predetermined second boundary condition.

16 Claims, 11 Drawing Sheets

(58) Field of Classification Search
CPC ........ B25J 9/163; B25J 9/1651; B25J 9/1653; B25J 9/1656; B25J 9/1664; B25J 9/1671; B25J 9/1674; G05B 19/19; G05B 2219/39065
See application file for complete search history.

(56) References Cited

OTHER PUBLICATIONS

Allen, Peter, "Class Notes, Trajectory Planning, COMS 4733", Oct. 22, 2015, http://www.cs.columbia.edu/~allen/F15/NOTES/trajectory.pdf (Year: 2015).*

Jiun Yih Kuan et al.: "A new time-efficient trajectory planning solution for humanoid robot arms", Robotics and Biomimetics, 2007. ROBIO 2007. IEEE International Conference on, IEEE, Piscataway, NJ, USA,pp. 312-317, XP031252822, ISBN: 978-1-4244-1761-2; Sections I, II.A, II.D; 2007.

X Jie Liu: "3D surface reconstruction based trajectory control for a magnetic scattering film plating robot", Journal of Intelligent Manufacturing, Kluwer Academic Publishers, BO, vol. 20, No. 6, pp. 719-726, XP019749939, I SSN: 1572-8145, pp. 720-725; 2008.

* cited by examiner

COMPUTER-ASSISTED ASCERTAINMENT OF A MOVEMENT OF AN APPARATUS

CROSS-REFERENCE TO RELATED APPLICATIONS

This application claims priority to EP Application No. 18172937.7, having a filing date of May 17, 2018, the entire contents of which are hereby incorporated by reference.

FIELD OF TECHNOLOGY

The following relates to a computer-assisted method for ascertaining a movement of an apparatus, and a computer program product and a system for carrying out the method.

BACKGROUND

The prior art has disclosed methods for planning the movement of apparatuses. One option for planning a movement of an apparatus is the so-called teach-in method, in which an apparatus is driven into predetermined positions by means of a controller. The positions are stored and driven to again within the scope of carrying out a movement (point-to-point control).

The patent document DE 10 2008 057 142 B4 has disclosed a method for computer-assisted movement planning for a robot. Spatial positions of a spatial point assigned to the robot in a fixed coordinate system are converted into configuration positions within the scope of the method on the basis of inverse kinematics. The configuration positions are described by axis positions of rotational and/or translational movement axes of the robot. The configuration positions are checked for collisions. A trajectory is formed along spatial positions of the spatial point, whose configuration positions are collision-free.

SUMMARY

An aspect relates to specifying a computer-assisted method for ascertaining a movement of an apparatus.

A computer-assisted method for ascertaining a movement of an apparatus, which has a tool that is movable by way of translational and/or rotational axes of movement of the apparatus, includes the following method steps: a first movement trajectory of the tool is ascertained in a first configuration space. A predetermined parameter of a movement of the tool is optimized when ascertaining the first movement trajectory. A check is carried out as to whether the first movement trajectory satisfies at least one predetermined first boundary condition. A second movement trajectory of the tool in a second configuration space is ascertained by transforming the first movement trajectory into the second configuration space if the first movement trajectory satisfies the predetermined first boundary condition. A check is carried out as to whether the second movement trajectory satisfies at least one predetermined second boundary condition. The first movement trajectory and/or the second movement trajectory are provided for moving the tool if the second movement trajectory satisfies the predetermined second boundary condition.

The apparatus can be embodied as a robot, as an articulated robot or as any other type of apparatus that can move the tool by way of translational and/or rotational movement axes. The tool can be embodied as any tool. By way of example, the tool can be a gripper or a milling machine. The movement of the apparatus can be represented by movement of a spatial point assigned to the apparatus. Since the tool should be used to carry out processes, it may be expedient to set the movement of the apparatus in relation to the movement of the tool such that the spatial point assigned to the apparatus is assigned to the tool. The movement of the tool is represented by a movement trajectory of the spatial point. A movement trajectory of the spatial point can be represented in various configuration spaces. By way of example, a configuration space can be a stationary basis coordinate system, for example a Cartesian coordinate system. A configuration space may also relate to positions of the movement axes of the apparatus, i.e., it may possibly be a multidimensional axis space. A position of the spatial point assigned to the tool in the stationary basis coordinate system, a so-called tool pose, can be described by positions of the movement axes in the axis space, the so-called configuration positions. Mathematically speaking, a tool pose can be ascertained by way of a coordinate transformation of the configuration position, which is referred to as direct kinematics. Conversely, a tool pose can be converted into a configuration position by way of an inverse coordinate transformation, which is referred to as inverse kinematics.

By way of example, the first movement trajectory can be ascertained by a spline interpolation. Polynomial chains are referred to as splines. A predetermined parameter of the movement of the tool, which is optimized when ascertaining the first movement trajectory, may be, e.g., a time during which the tool should be moved along the first movement trajectory. In this case, optimizing the predetermined parameter may consist of minimizing the time, for example. A predetermined boundary condition that should be observed by the first movement trajectory may consist of, for example, a requirement of the apparatus being collision-free when moving the tool along the first movement trajectory. However, a process tolerance, which should be observed when moving the tool along the first movement trajectory, may also be a predetermined boundary condition.

Predetermined boundary conditions and optimization criteria can be formulated in the various configuration spaces. It may be the case here that, for example, a predetermined boundary condition can be formulated more easily and efficiently in one configuration space than in another configuration space. If the first movement trajectory is ascertained in a configuration space in which a predetermined boundary condition can be formulated more efficiently, the predetermined boundary condition can be advantageously observed more precisely. By way of example, should the apparatus be moved in collision-free fashion when moving the tool along the first movement trajectory, collision-free spatial sections can be embodied as tunnels in one configuration space. Depending on the selection of the configuration space, such a collision-free tunnel can have a curved or straight embodiment. The first movement trajectory can be ascertained more efficiently in a straight tunnel than in a tunnel with a curved embodiment. Thus, ascertaining the first movement trajectory can be more efficient by selecting a suitable configuration space. Moreover, the selection of the suitable configuration space can make the first movement trajectory more intuitively accessible and predictable for a user.

Thus, different predetermined boundary conditions in different configuration spaces are taken into account and checked in the method for ascertaining the movement of the apparatus. For this reason, a second movement trajectory is ascertained in the second configuration space within the scope of the method by transforming the first movement trajectory into the second configuration space after ascertaining the first movement trajectory in the first configuration space if the first movement trajectory satisfies the predetermined first boundary condition. Subsequently, a check is carried out as to whether the second movement trajectory satisfies the predetermined second boundary condition. Advantageously, the movement of the apparatus is planned in different configuration spaces in this manner, as a result of which the ascertainment of the movement can be more efficient.

A first partial movement of the tool is set by a first section of the first movement trajectory. A second partial movement of the tool is set by a second section of the second movement trajectory.

It may be expedient to subdivide the movement of the tool into partial movements. By way of example, it may be expedient to set the first partial movement, in which the tool is intended to be moved in free space without carrying out a process, in the first configuration space if the first partial movement in free space can be formulated more efficiently in the first configuration space than in the second configuration space. Conversely, it may be the case that the second partial movement, in which the tool should carry out a process, can be formulated more efficiently in the second configuration space than in the first configuration space. By way of example, it may be the case that the first partial movement in the first configuration space is described by a first section of the first movement trajectory with a straight embodiment while the second partial movement is described by a curved section of the first movement trajectory in the first configuration space. Conversely, it may be the case that the second partial movement in the second configuration space is described by a second section of the second movement trajectory with a straight embodiment while the first partial movement in the second configuration space is described by a curved section of the second movement trajectory. What lends itself in this case is setting the movement of the tool in such a way that the partial movements are set by sections of the movement trajectories each with a straight embodiment in the respective configuration spaces.

An advantage over existing methods for ascertaining a movement of an apparatus consists of the apparatus not needing to be stopped at a transition from the first partial movement to the second partial movement of the tool if the movement is planned on the basis of the present computer-assisted method. This is due to the fact that the movement is planned in both configuration spaces with the predetermined boundary conditions being observed. Previous approaches had the disadvantage that the partial movements set in the different configuration spaces were only planned in the corresponding configuration space in each case. By contrast, the entire movement is planned in both configuration spaces in the present method, as a result of which there can be a fluid transition from the first to the second partial movement, i.e., without stopping and at a relatively high speed. Advantageously, this allows the partial movements of the tool to be efficiently linked to one another.

This is comparable with smoothing from the first to the second partial movement. However, in comparison with the point-to-point control, the first movement trajectory need not necessarily deviate from a predetermined transition point between the first and the second section in order to obtain a fluid movement since the first movement trajectory is ascertained as a single polynomial chain over the first and the second section. This spline is continuously differentiable at each point, and so active smoothing, in which a smoothing distance is predetermined, need not take place. Typically, a continuously undifferentiable point of a movement trajectory forms a stopping point of the apparatus since there is a jump-like change in a speed at this point. An acceleration at this point can be described by a delta distribution; thus, the acceleration can adopt arbitrary values.

Even though there is no active smoothing in the computer-assisted method for ascertaining the movement of the apparatus, it may be the case that the tool must carry out a process in the second section of the first movement trajectory while observing a process tolerance. This process tolerance needs to be observed in the transition from the first section to the second section. Thus, the process tolerance can be understood to be a smoothing distance.

In one embodiment, the second section of the second movement trajectory has a first portion and a second portion. The first section of the first movement trajectory is formed between the first portion and the second portion of the second section of the second movement trajectory.

By way of example, the tool can carry out a first process at a first location during the movement along the first portion. Subsequently, the tool can be moved by a movement along the first section in free space in order to carry out a second process at a second location. The tool can be moved along the second portion when carrying out the second process. Advantageously, this combined movement of the tool can be implemented without stopping the apparatus. Other combined movements with any number of portions of the first section of the first movement trajectory and/or any number of portions of the second section of the second movement trajectory are also possible.

In one embodiment, the first configuration space is a coordinate system relating to at least two translational and/or rotational movement axes of the apparatus. The second configuration space is a Cartesian coordinate system or a coordinate system with generalized coordinates. Thus, the first configuration space can be related to only two translational movement axes, only two rotational movement axes or one translational movement axis and one rotational movement axis. Alternatively, the first configuration space is a Cartesian coordinate system or a coordinate system with generalized coordinates and the second configuration space is the axis space. By way of example, spherical or cylindrical coordinates can be generalized coordinates. These may offer the advantage of, for example, being able to describe a movement of the tool on a spherical surface more easily.

In one embodiment, a further first movement trajectory is ascertained in the first configuration space if the first movement trajectory does not satisfy the predetermined first boundary condition. The predetermined parameter of the movement of the tool is optimized while observing the predetermined first boundary condition when ascertaining the further first movement trajectory.

In one embodiment, a check as to whether the tool can be moved along the first movement trajectory in such a way that the apparatus is moved in collision-free fashion is carried out when checking whether the first movement trajectory satisfies the predetermined first boundary condition.

In one embodiment, ascertaining the further first movement trajectory is implemented in such a way that the apparatus is moved around an obstacle when moving the tool along the further first movement trajectory. Advantageously, this can avoid damage to the apparatus and/or the obstacle.

In one embodiment, ascertaining the further first movement trajectory is implemented by means of a spline interpolation. At least one first node is predetermined within the scope of the spline interpolation. The first node is chosen in such a way that the apparatus is moved around the obstacle when moving the tool along the further first movement trajectory.

In one embodiment, an additional first movement trajectory is ascertained in the first configuration space if the second movement trajectory does not satisfy the predetermined second boundary condition. The predetermined parameter of the movement of the tool is optimized while observing the predetermined second boundary condition when ascertaining the additional first movement trajectory.

In one embodiment, a check as to whether the tool can be moved along the second movement trajectory in such a way that a predetermined process tolerance is observed is carried out when checking whether the second movement trajectory satisfies the predetermined second boundary condition.

In one embodiment, a check as to whether a predetermined path and/or a predetermined speed and/or a predetermined acceleration of the apparatus or of the tool are maintained is carried out when checking whether the tool can be moved along the second movement trajectory in such a way that the predetermined process tolerance is observed.

By way of example, the predetermined path can be a path along which the tool should carry out a process, optionally while observing a certain tolerance. Thus, the predetermined path can be a strip in the second configuration space, within which the tool should be moved.

In one embodiment, the additional first movement trajectory is ascertained by adapting the first movement trajectory. The first movement trajectory is adapted in such a way that the predetermined process tolerance is observed when moving the tool along the additional first movement trajectory.

In one embodiment, the first movement trajectory is adapted in such a way that the apparatus or the tool maintains the predetermined path and/or the predetermined speed and/or the predetermined acceleration when moving the tool along the additional first movement trajectory.

In one embodiment, the first movement trajectory is adapted by means of a spline interpolation. At least one second node is predetermined within the scope of the spline interpolation. The second node is chosen in such a way that the tool is moved along the additional first movement trajectory while maintaining the predetermined path and/or the predetermined speed and/or the predetermined acceleration of the apparatus or of the tool.

In one embodiment, movement means of the tool are actuated by a processor in such a way that the tool is moved along the first and/or second movement trajectory.

A computer program product (non-transitory computer readable storage medium having instructions, which when executed by a processor, perform actions) comprises commands which prompt a computer to carry out the computer-assisted method for ascertaining a movement of an apparatus when said computer executes the computer program.

A system for data processing comprises a processor which is embodied to carry out the computer-assisted method for planning a movement of an apparatus.

BRIEF DESCRIPTION

Some of the embodiments will be described in detail, with reference to the following figures, wherein like designations denote like members, wherein.

DETAILED DESCRIPTION

Figure 1:
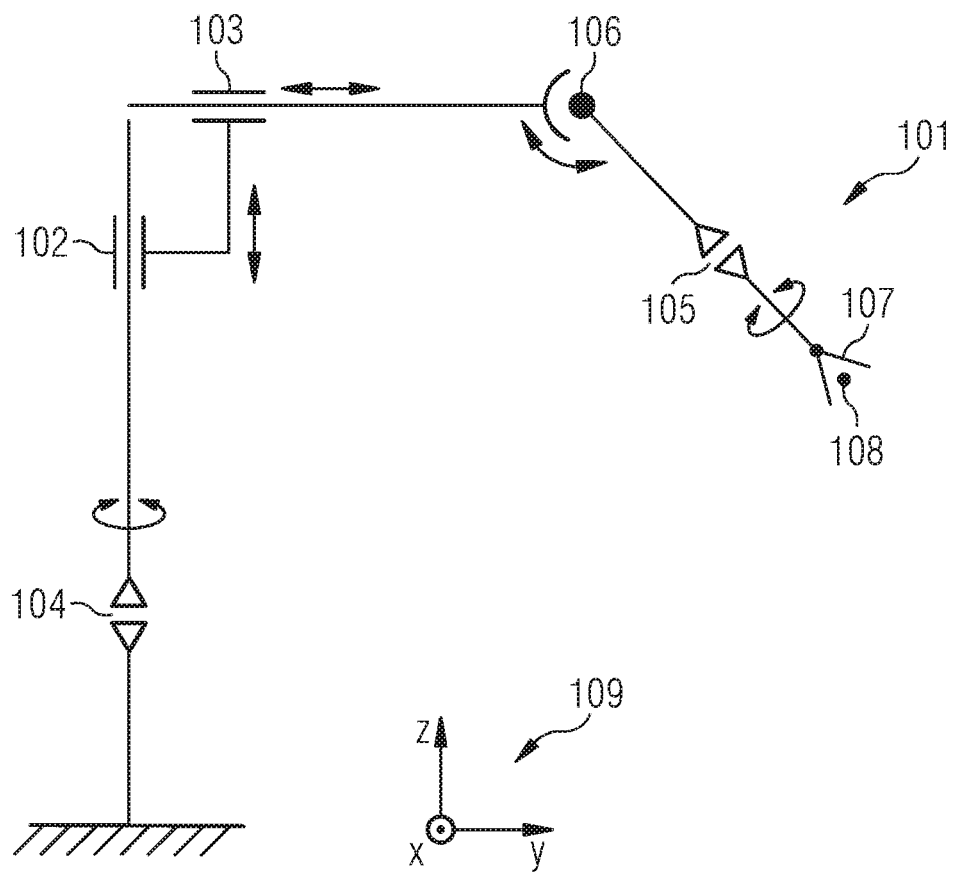
FIG. 1 shows an apparatus with translational and rotational movement axes.

FIG. 1 schematically shows a kinematic design of an exemplary apparatus 101 comprising a tool 107 that is movable by way of translational movement axes 102, 103 and rotational movement axes 104, 105, 106 of the apparatus 101. For reasons of simplicity, movement means such as motors and drives of the apparatus 101 are not shown in FIG. 1. The apparatus 101 can be embodied as a robot, as an articulated robot or as any other type of apparatus 101 that can move the tool 107 by way of translational and/or rotational movement axes 102, 103, 104, 105, 106. The translational movement axes 102, 103 are embodied as linear articulations. The rotational movement axes 104, 105, 106 can be embodied in the form of articulations or hinges. Rigid connecting elements are formed between two articulations of the apparatus 101. Movement options of the connecting elements are indicated by double-headed arrows in FIG. 1.

The apparatus 101 has a first translational axis 102 and a second translational axis 103 in exemplary fashion. However, deviating from the illustration in FIG. 1, the apparatus 101 may have any number of translational axes; by way of example, the apparatus 101 can have no translational axis, only one translational axis or three translational axes. The translational axes 102, 103 can also be referred to as translational articulations or linear articulations and are distinguished by virtue of a subsequent connecting element of the apparatus 101 being movable along a straight line. A connecting element of the apparatus 101 following the first translational axis 102 can be moved along a z-direction illustrated in FIG. 1. The connecting element following the first translational axis 102 has an angled embodiment in the exemplary apparatus 101 and connects the first translational axis 102 to the second translational axis 103. A connecting element of the apparatus 101 following the second translational axis 103 can be moved along a y-direction illustrated in FIG. 1. In the exemplary apparatus 101, the connecting element following the second translational axis 102 has a straight embodiment and connects the second translational axis 103 to a third rotational axis 106.

In exemplary fashion, the apparatus 101 has a first rotational axis 104, a second rotational axis 105 and the third rotational axis 106. The first and the second rotational axis 104, 105 are embodied as flush rotational axes in an exemplary manner, while the third rotational axis 106 is embodied as a non-flush rotational axis in an exemplary manner. However, deviating from the illustration in FIG. 1, the apparatus 101 may have any number of flush and non-flush rotational axes. A flush rotational axis 104, 105 is distinguished by virtue of a subsequent connecting element being rotatable about an axis extending along the subsequent connecting element. Flush rotational axes may also be referred to as rotary joints. A non-flush rotational axis 106 is distinguished by virtue of a subsequent connecting element being rotatable along an axis extending perpendicular to the subsequent connecting element. Non-flush rotational axes may also be referred to as folding joints. In the illustration of FIG. 1, a connecting element of the apparatus 101 following the non-flush rotational axis 106 can be rotated about an axis formed along an x-direction shown in FIG. 1. However, the apparatus 101 may also have rotational axes with a different embodiment, for example ball-and-socket joints.

The tool 107 can also be referred to as an end effector. The tool 107 of the apparatus 101 is embodied as a gripper in exemplary fashion. However, the tool 107 can also be embodied as, for example, a milling machine, a drill, a spray head, a welding head, a laser, a waterjet cutting head, a measuring tool or any other tool 107. The tool 107 may also be embodied as an optical sensor; by way of example, the tool 107 can be embodied as an x-ray scanner and used within the scope of imaging methods in medicine.

A movement of the apparatus 101 can be ascertained and represented in various configuration spaces. Here, a movement trajectory of a spatial point 108 assigned to the apparatus 101 is ascertained and presented. By way of example, the spatial point 108 assigned to the apparatus 101 can be a tool center point (TCP), which is schematically shown in FIG. 1. It may be expedient for the spatial point 108 that is assigned to the apparatus 101 to be a spatial point 108 that is assigned to the tool 107 since a movement of the tool 107 is relevant within the scope of a process to be carried out by means of the tool 107. However, the spatial point 108 can be assigned to any part of the apparatus 101, for example a connecting element.

By way of example, a first configuration space can be a coordinate system that is related to the movement axes 102, 103, 104, 105, 106. Such a coordinate system can also be referred to as an axis system. The representation of the movement trajectory of the spatial point 108 is thus implemented in a multidimensional axis space. In relation to the apparatus 101 shown in FIG. 1, the axis system of the apparatus 101 has five coordinate axes. Coordinates related to the movement axes 102, 103, 104, 105, 106 specify a configuration position of the apparatus 101. Thus, a position of the spatial point 108 assigned to the tool 107 can be specified by a corresponding configuration position of the apparatus 101 in the axis space.

By way of example, as illustrated in exemplary fashion in FIG. 1, a Cartesian coordinate system 109, the origin of which is freely selectable, can be a second configuration space. The second configuration space can also be referred to as world coordinate system or stationary basis coordinate system. Instead of being a Cartesian coordinate system 109, the second configuration space can also be a coordinate system with generalized coordinates. By way of example, the generalized coordinates can be spherical coordinates or cylindrical coordinates. By way of example, this can be useful if the spatial point 108 assigned to the tool 107 should be moved along a movement trajectory situated on a spherical surface or on a cylinder surface.

A movement of the spatial point 108 can be represented in the axis space or in the stationary basis coordinate system. A movement trajectory represented in the axis space can be transformed into the stationary basis coordinate system by means of direct kinematics. Conversely, a movement trajectory represented in the stationary basis coordinate system can be transformed into the axis space by means of inverse kinematics. By way of example, such coordinate transformations can be implemented by means of matrix multiplication. By way of example, a configuration position is multiplied by a transformation matrix in this case, as a result of which a position in the stationary basis coordinate system is ascertained.

A transformation from the axis space into the stationary basis coordinate system by means of direct kinematics is unique; i.e., each configuration position in the axis space can be assigned a unique position in the stationary basis coordinate system, a so-called tool pose. Conversely, a transformation from the stationary basis coordinate system into the axis space by means of inverse kinematics can be ambiguous; i.e., a plurality of possible configuration positions in the axis space may be assigned to a tool pose in the stationary basis coordinate system under certain circumstances. Such an ambiguity is present for the second rotational axis 105, for example, in the apparatus 101 illustrated in FIG. 1 since a position of the spatial point 108 assigned to the tool 107 does not change when an angle related to the second rotational axis 105 is varied. Moreover, it may be the case that, within the scope of the transformation from the stationary basis coordinate system into the axis space by means of inverse kinematics, it is not possible to ascertain a configuration position in the axis space for a tool pose in the stationary basis coordinate system.

Figure 2:
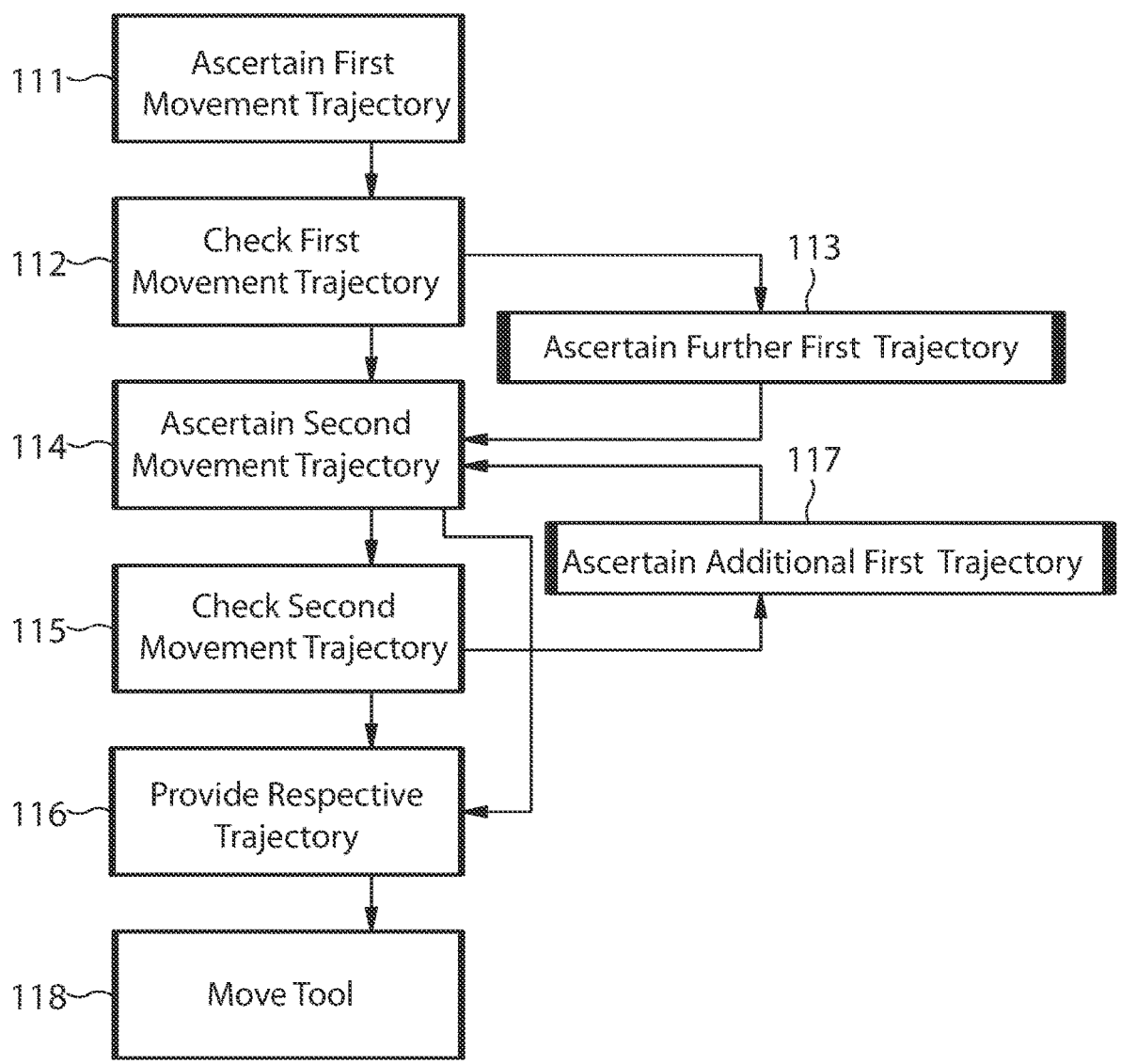
FIG. 2 shows a model of a computer-assisted method for ascertaining a movement of an apparatus.

FIG. 2 schematically shows a computer-assisted method for ascertaining a movement of an apparatus.

A first movement trajectory of the tool in a first configuration space is ascertained in a first method step 111. A predetermined parameter of a movement of the tool is optimized when ascertaining the first movement trajectory.

A check as to whether the first movement trajectory satisfies at least one predetermined first boundary condition is carried out in a second method step 112. If the first movement trajectory satisfies the predetermined first boundary condition, a fourth method step 114 follows the second method step 112.

A further first movement trajectory is ascertained in the first configuration space in an optional third method step 113 if the first movement trajectory does not satisfy the predetermined first boundary condition. When ascertaining the further first movement trajectory, the predetermined parameter of the movement of the tool is optimized while observing the predetermined first boundary condition. Thus, the further first movement trajectory always satisfies the predetermined first boundary condition. The fourth method step 114 follows the third method step 113.

Within the scope of the fourth method step 114, a second movement trajectory of the tool is ascertained in a second configuration space by transforming the first movement trajectory into the second configuration space. Alternatively, the further first movement trajectory is transformed into the second configuration space if the third method step 113 took place before the fourth method step 114. Thus, a further second movement trajectory is ascertained in this case by the transformation of the further first movement trajectory.

A check is carried out in a fifth method step 115 as to whether the second movement trajectory or the further second movement trajectory satisfies at least one predetermined second boundary condition. If the second movement trajectory or the further second movement trajectory satisfies the predetermined second boundary condition, a sixth method step 116 follows the fifth method step 115.

An additional first movement trajectory is ascertained in the first configuration space in an optional seventh method step 117 if the second movement trajectory or the further second movement trajectory does not satisfy the predetermined second boundary condition. The predetermined parameter of the movement of the tool is optimized while observing the second boundary condition when ascertaining the additional first movement trajectory. The seventh method step 117 is followed by the fourth method step 114; i.e., the additional first movement trajectory is transformed into the second configuration space, as a result of which an additional second movement trajectory is ascertained. If the seventh method step 117 and, following this, the fourth method step 114 are carried out, the fourth method step is followed by the sixth method step 116.

The first movement trajectory and/or the second movement trajectory or the further first and/or the further second movement trajectory or the additional first and/or the additional second movement trajectory are provided in the sixth method step 116 for the purposes of moving the tool if the second movement trajectory or the further second movement trajectory satisfies the predetermined second boundary condition. The additional second movement trajectory always satisfies the second boundary condition.

Within the context of the entire description, the provision of a movement trajectory means that the movement trajectory is provided to a processor which is embodied to actuate the apparatus in such a way that the tool is moved along the ascertained first and/or second movement trajectory.

In an optional eighth method step 118, the tool is moved along the first movement trajectory or along the further first movement trajectory or the additional first movement trajectory. The tool is moved by the processor with the aid of the movement means. The processor transmits control signals to the movement means of the apparatus on the basis of the provided movement trajectory in order to move the apparatus according to the provided movement trajectory.

The computer-assisted method for ascertaining a movement of an apparatus, shown in FIG. 2, is explained in detail below. By way of example, the method can be applied to the apparatus 101 shown in FIG. 1. However, on account of the five-dimensional axis space of the apparatus 101, movement trajectories in the axis space are not immediately representable by graphical means. For this reason, the method is explained below in an exemplary fashion on the basis of a two-axis apparatus and planned within a plane in actual space. However, the method is not restricted to movements of a two-axis apparatus or movements of another apparatus in a plane.

Figure 3:
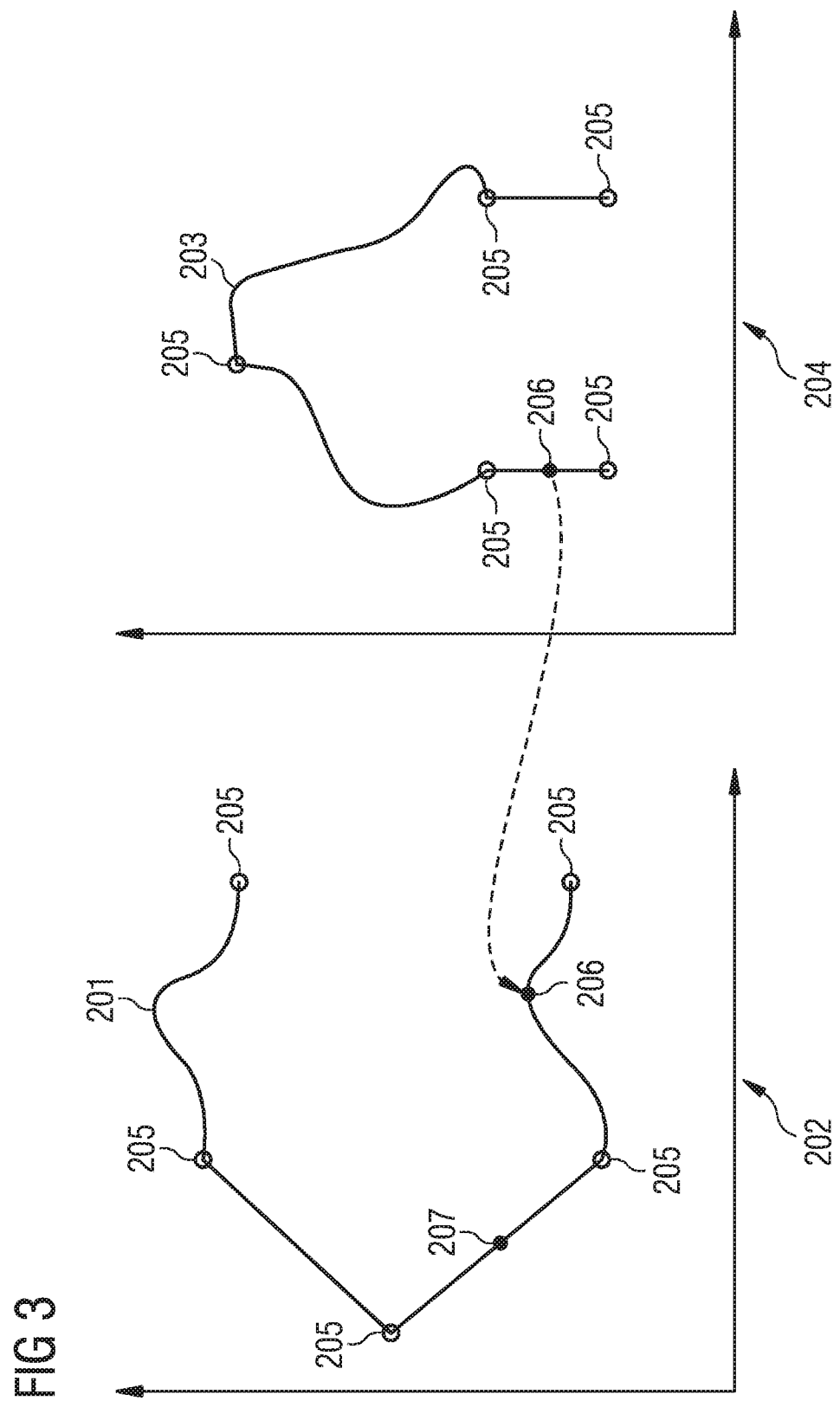
FIG. 3 shows a predetermined movement of an apparatus on the basis of a first trajectory in a first configuration space and a second trajectory in a second configuration space.

FIG. 3 schematically shows the first configuration space 202 and the second configuration space 204. Both configuration spaces 202, 204 each have two coordinate axes. A predetermined movement of the two-axis apparatus on the basis of a first trajectory 201 is set in the first configuration space 202. The same predetermined movement is set in the second configuration space 204 on the basis of a second trajectory 203. The trajectories 201, 203 relate to a spatial point assigned to the apparatus. By way of example, the trajectories 201, 203 relate to a tool center point of the tool of the apparatus.

A predetermined parameter of the movement of the tool should be optimized when ascertaining the movement of the apparatus; i.e., the predetermined parameter has not been optimized in the predetermined movement. As shown in exemplary fashion in FIG. 3, the preliminary movement can be produced by means of five predetermined configuration positions 205. By way of example, the predetermined configuration positions 205 may be ascertained within the scope of a teach-in method. The predetermined configuration positions 205 are denoted by means of circular rings in FIG. 2. The sections of the trajectories 201, 203 which are formed between the predetermined configuration positions 205 have been chosen arbitrarily in FIG. 3. By way of example, two sections of the first trajectory 201 and two sections of the second trajectory 203 have a straight embodiment.

The first movement trajectory of the tool of the apparatus, which is movable by way of translational and/or rotational movement axes of the apparatus, is ascertained in the first configuration space 202 within the scope of the first method step.

Ascertaining the first movement trajectory may comprise selecting an initial point and an end point of the first movement trajectory. Any points on the first trajectory 201 and/or the second trajectory 203 can be selected as initial and end point; i.e., the first movement trajectory to be ascertained can relate to the entire first or second trajectory 201, 203 or to merely a part of the first or second trajectory 201, 203. Selecting the initial point and/or the end point may comprise transforming the initial point and/or the end point into the first configuration space 202 if the initial point and/or the end point was selected in the second configuration space 204.

By way of example, if an initial point 206 is selected in the second configuration space 204, the initial point 206 is transformed into the first configuration space 202. The transformation of the initial point 206 is indicated by means of a dashed arrow in FIG. 3. An end point 207 of the first movement trajectory can be selected, for example, in the first configuration space 202 and need not be transformed. The initial point 206 and the end point 207 of the first movement trajectory were selected in an exemplary manner in such a way that the first movement trajectory is only related to a part of the first or second trajectory 201, 203.

The predetermined parameter of the movement of the tool is optimized when ascertaining the first movement trajectory. By way of example, the predetermined parameter can be a time within which the tool should be moved from the initial point 206 to the end point 207. By way of example, the time within which the tool should be moved along the first movement trajectory from the initial point 206 to the end point 207 can be minimized in this case. However, the predetermined parameter may also be an energy that is necessary to move the tool along the first movement trajectory. In this case, the energy required to move the tool along the first movement trajectory can be minimized. The predetermined parameter may also be a path length. In this case, the path length of the first movement trajectory can be minimized.

Figure 4:
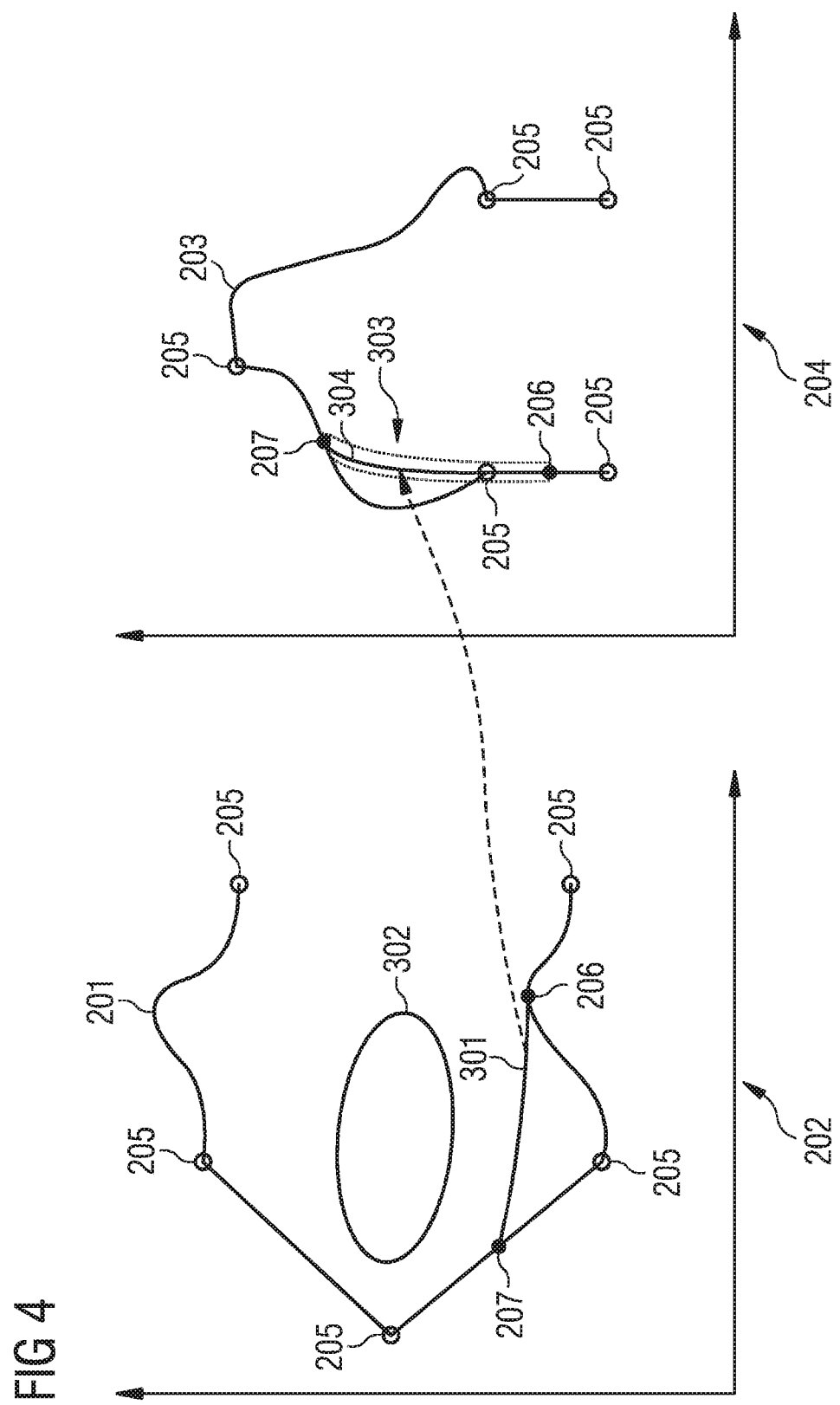
FIG. 4 shows an ascertainment of a first and a second movement trajectory and a check of the first movement trajectory in respect of a predetermined first boundary condition and a check of the second movement trajectory in respect of a predetermined second boundary condition.

FIG. 4 schematically elucidates further method steps of the method. Apart from the transformation of the initial point 206, FIG. 4 shows the elements shown in FIG. 3, with the references being maintained unchanged. In comparison with FIG. 3, FIG. 4 also shows additional elements.

The first movement trajectory 301 of the tool was ascertained between the initial point 206 and the end point 207, with the predetermined parameter having been optimized. By way of example, the first movement trajectory 301 can be ascertained by means of a spline interpolation.

A check is carried out within the scope of the second method step as to whether the first movement trajectory 301 satisfies at least the predetermined first boundary condition. To this end, a check can be carried out, for example, as to whether the tool can be moved along the first movement trajectory 301 in such a way that the apparatus is moved in collision-free fashion.

An exemplary obstacle 302 is illustrated in the first configuration space 202 in FIG. 4. By way of example, the obstacle 302 can be an object that is arranged in the vicinity of the apparatus. When checking whether the tool can be moved along the first movement trajectory 301 in such a way that the apparatus is moved in collision-free fashion, a check is carried out as to whether a part of the apparatus collides with the obstacle 302. Since the first movement trajectory 301 is only related to a spatial point assigned to the tool, the only deduction that can be made on the basis of the first movement trajectory 301 illustrated in the first configuration space 202 and on the basis of the obstacle 302 schematically illustrated in the first configuration space 202 is whether or not the spatial point assigned to the tool collides with the obstacle 302; however, it is not possible to tell whether a further part of the apparatus collides with the obstacle 302. That is to say that, when checking whether the tool can be moved along the first movement trajectory 301 in such a way that the apparatus is moved in collision-free fashion, a check is carried out as to whether or not any spatial point assigned to the apparatus collides with the obstacle 302. By way of example, a connecting element of the apparatus may collide with the obstacle 302.

Within the scope of the fourth method step, the second movement trajectory 304 of the tool is ascertained in the second configuration space 204 by transforming the first movement trajectory 301 into the second configuration space 204 if the first movement trajectory 301 satisfies the predetermined first boundary condition.

Thus, for example, if the tool can be moved along the first movement trajectory 301 in such a way that the apparatus is moved in collision-free fashion, the first movement trajectory 301 is transformed into the second configuration space 204. The transformation of the first movement trajectory 301 into the second configuration space 204 is indicated on the basis of a dashed arrow in FIG. 4; i.e., the first movement trajectory 301 satisfies the predetermined first boundary condition. Transforming the first movement trajectory is implemented by coordinate transformation, for example by a matrix multiplication from positions on the first movement trajectory.

A check is carried out within the scope of the fifth method step as to whether the second movement trajectory 304 satisfies the predetermined second boundary condition. Here, a check can be carried out, for example, as to whether the tool can be moved along the second movement trajectory 304 in such a way that a predetermined process tolerance is observed.

By way of example, whether a predetermined path and/or a predetermined speed and/or predetermined acceleration of the apparatus or of the tool can be maintained can be checked as a predetermined process tolerance. By way of example, the predetermined path can be a path along which the tool should carry out a process. By way of example, if the tool is a laser which, for example, should be guided along a line within the scope of a laser ablation process, the predetermined path arises from the line along which the laser should be guided and, optionally, from a tolerance, within which the laser may deviate from the line. By way of example, allowing the laser to deviate by at most 100 μm from the line may be predetermined. In FIG. 4, an exemplary predetermined path 303 is indicated schematically in the second configuration space 204 on the basis of two dotted lines; i.e., the spatial point assigned to the tool must be moved within the predetermined path 303 in the illustrated example.

By way of example, the predetermined speed can be a speed of the tool that must be maintained within the scope of a process. By way of example, the tool may be a spray head, with the aid of which a lacquer or an adhesive should be applied by spraying. In this example, the spray head having to maintain a speed range so that the material to be applied is applied uniformly may be predetermined as a process tolerance.

By way of example, the predetermined acceleration can be an acceleration of the tool that must be maintained within the scope of a process. By way of example, the tool can be embodied as a gripper. The gripper may be provided to move open containers that are filled with liquid. By way of example, the gripper not exceeding a maximum acceleration to ensure that liquid remains in the container may be predetermined as a process tolerance.

The predetermined path, the predetermined speed and the predetermined acceleration may relate either to the tool or to the apparatus, i.e., a part of the apparatus, for example a connecting element.

The first movement trajectory 301 and/or the second movement trajectory 304 for moving the tool are provided within the scope of the sixth method step of the method. Here, the movement trajectories 301, 304 are provided to the processor. The processor is embodied to carry out the method. The tool is moved along the first movement trajectory 301 within the scope of the eighth method step. To this end, the processor transmits control signals to the motors and drives of the apparatus.

Figure 5:
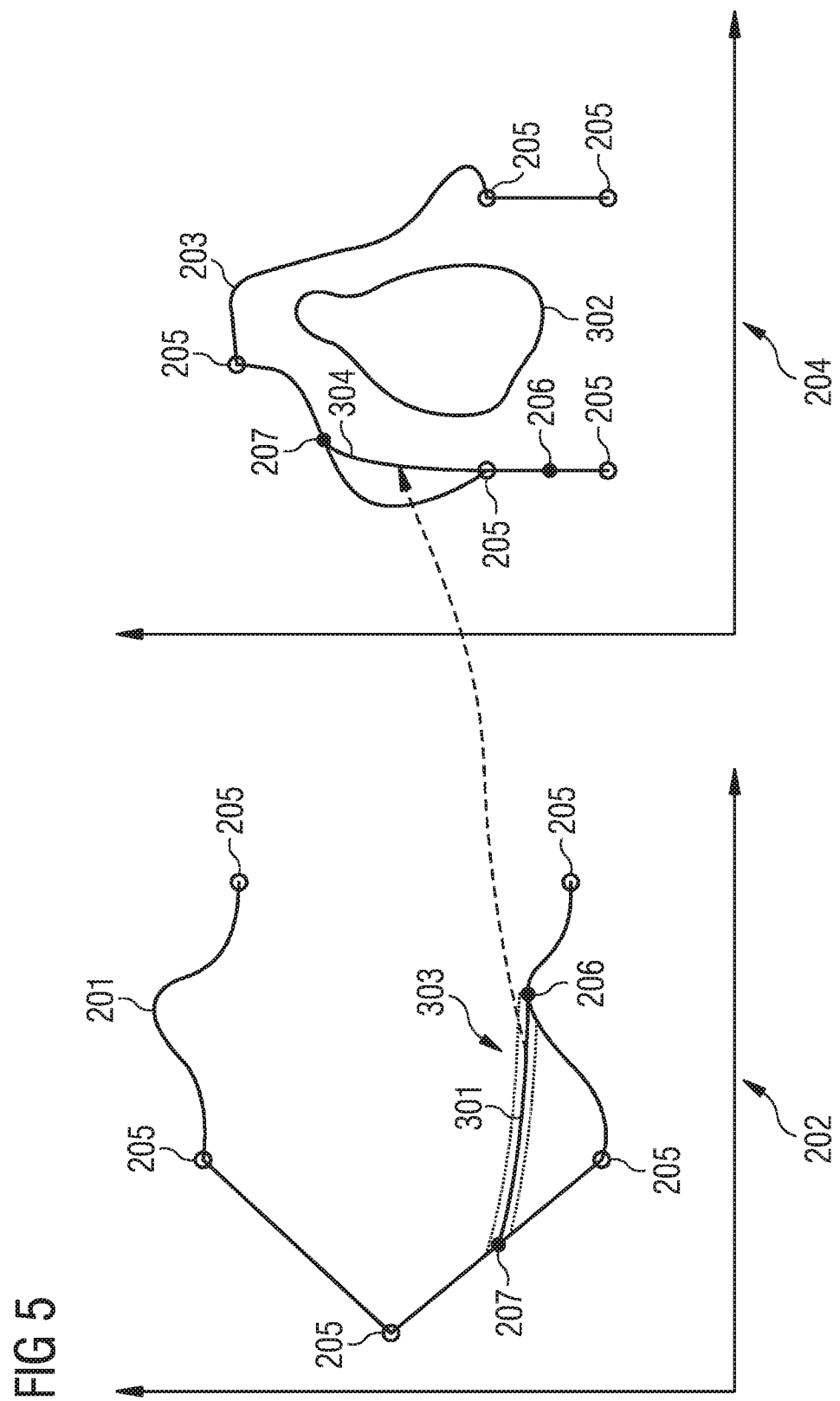
FIG. 5 shows an alternative in which the first movement trajectory is checked in respect of the predetermined second boundary condition and the second movement trajectory is checked in respect of the predetermined first boundary condition.

An alternative consists of initially checking whether the first movement trajectory 301 satisfies the predetermined second boundary condition. If this is the case, the second movement trajectory 304 is ascertained by transforming the first movement trajectory 301. Moreover, a check is carried out as to whether the second movement trajectory 304 satisfies the predetermined first boundary condition. This is illustrated schematically in FIG. 5. FIG. 5 shows that a check is carried out as to whether the first movement trajectory 301 observes the process tolerance, for example, which is illustrated on the basis of the predetermined path 303, which indicates the process tolerance in exemplary fashion.

In contrast to FIG. 4, the obstacle 302 is illustrated in the second configuration space 204 in FIG. 5 since the second movement trajectory 304 is checked for a freedom of collision, for example, after the second movement trajectory 304 was ascertained by transforming the first movement trajectory 301. The obstacle 302 has a different form in the second configuration space 204 than in the first configuration space 202.

Within the scope of the sixth method step, the first movement trajectory 301 and/or the second movement trajectory 304 are provided, in this alternative of the method, to the processor for controlling the apparatus for the purposes of moving the tool should the second movement trajectory 304 satisfy the predetermined first boundary condition, with the second movement trajectory 304 having been ascertained previously in the third method step by transforming the first movement trajectory 301 if the first movement trajectory 301 satisfied the predetermined second boundary condition.

The optional third method step is explained below. The third method step is explained in exemplary fashion, proceeding from the method steps already described in FIG. 4. However, the third method step can also be carried out proceeding from the method steps described in FIG. 5. Here, a check should be carried out in each case as to whether the first movement trajectory 301 or the second movement trajectory 304 should satisfy the predetermined first boundary condition.

Figure 6:
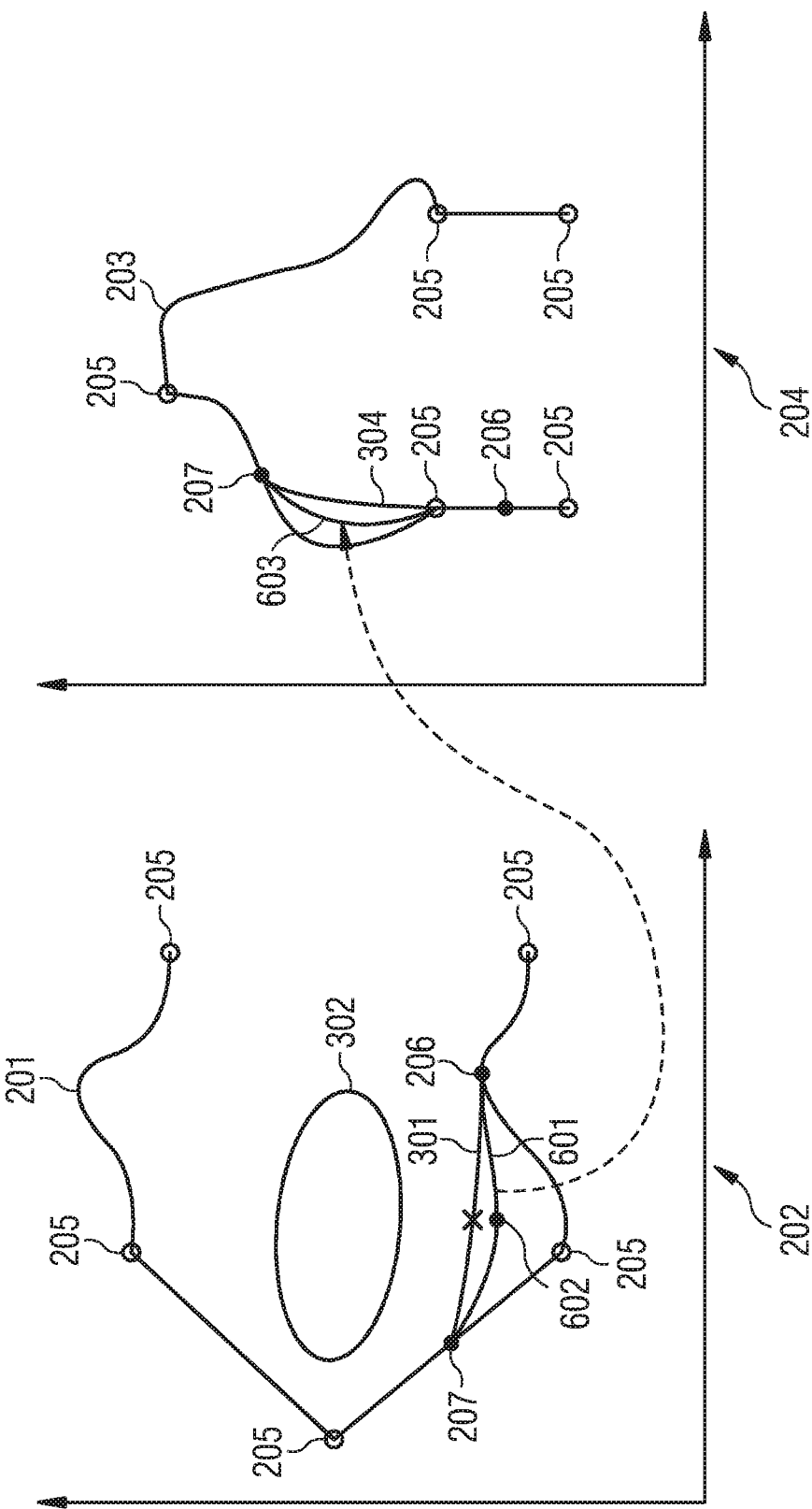
FIG. 6 shows an ascertainment of a further first and a further second movement trajectory.

FIG. 6 schematically elucidates the further method step. Apart from the predetermined path 303, FIG. 6 shows the elements of FIG. 4, the reference signs of which are maintained. FIG. 6 also shows additional elements to the elements illustrated in FIG. 4.

A further first movement trajectory 601 is ascertained in the first configuration space 202 within the scope of the third method step should the first movement trajectory 301 not satisfy the predetermined first boundary condition. When ascertaining the further first movement trajectory 601, the predetermined parameter of the movement is optimized while observing the predetermined first boundary condition.

The fact that the first movement trajectory 301 does not satisfy the predetermined first boundary condition is indicated in FIG. 6 by way of a cross on the first movement trajectory 301. By way of example, the first movement trajectory 301 may have been ascertained in such a way that the apparatus, for example a connecting element of the apparatus, collides with the obstacle 302 when the tool is moved along the first movement trajectory 301. In this case, the further first movement trajectory 601 is ascertained in such a way that the apparatus is moved around the obstacle 302 when moving the tool along the further first movement trajectory 601.

By way of example, the further first movement trajectory 601 can be ascertained by means of a spline interpolation. At least one first node 602 is predetermined within the scope of the spline interpolation. The at least one first node 602 is chosen such that the apparatus is moved around the obstacle 302 when the tool is moved along the further first movement trajectory 601.

Alternatively, the further first movement trajectory 601 can be ascertained by means of a potential field method. In the potential field method, an obstacle 302 and an initial point 206 are each treated formally as sources of a repulsive potential, while an end point 207 of the movement is treated formally as the source of an attractive potential. A differentiable effective potential with a global minimum at the end point 207 is obtained. The obstacle 302 represents a maximum of the potential. Then, actual forces and/or torques that are produced by drives of the movement axes of the apparatus to move the tool can be ascertained from the virtual force that acts on the apparatus in the effective potential. The processor transmits appropriate control signals to the drives so that the drives can produce the forces and/or torques.

After the further first movement trajectory 601 has been ascertained, a further second movement trajectory 603 is ascertained by transforming the further first movement trajectory 601 into the second configuration space 204. This is indicated on the basis of a dashed arrow in FIG. 6. After ascertaining the further second movement trajectory 603, a check is carried out as to whether the further second movement trajectory 603 satisfies the predetermined second boundary condition. If this is the case, the further first movement trajectory 601 and/or the further second movement trajectory 603 are provided to the processor for moving the tool.

The optional seventh method step is explained below. The seventh method step is explained in an exemplary fashion proceeding from the third method step in FIG. 6. However, the seventh method step can also be carried out proceeding from the method steps described in FIG. 4 or proceeding from the method steps described in FIG. 5. Here, care has to be taken in each case as to whether the first movement trajectory 301 or the second movement trajectory 304 should satisfy the predetermined second boundary condition.

Figure 7:
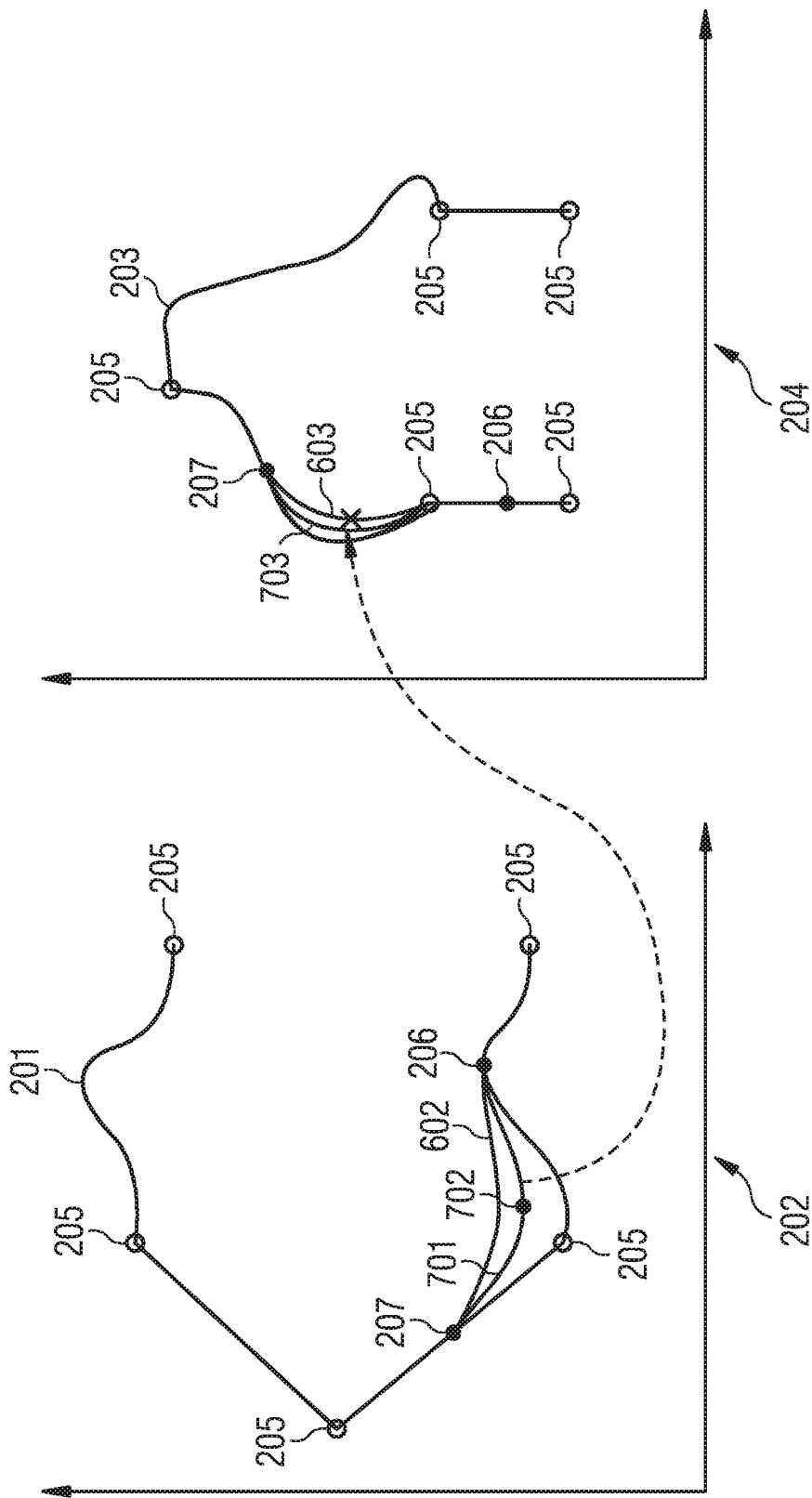
FIG. 7 shows an ascertainment of an additional first and an additional second movement trajectory.

FIG. 7 schematically elucidates the seventh method step. Apart from the obstacle 302, FIG. 7 contains the elements of FIG. 6, the reference signs of which are maintained. Additionally, FIG. 7 shows further elements.

An additional first movement trajectory 701 is ascertained in the first configuration space 202 within the scope of the seventh method step if the further second movement trajectory 603 does not satisfy the predetermined second boundary condition. The predetermined parameter of the movement is optimized while observing the predetermined second boundary condition when ascertaining the additional first movement trajectory 701.

The fact that the further second movement trajectory 603 does not satisfy the predetermined second boundary condition is indicated by a cross on the further second movement trajectory 603 in FIG. 7. The additional first movement trajectory 701 can be ascertained by adapting the further first movement trajectory 602. The further first movement trajectory 602 can be adapted in such a way that the apparatus or the tool observes the predetermined process tolerance when the tool is moved along the additional first movement trajectory 701. By way of example, the further first movement trajectory 602 can be adapted in such a way that the apparatus or the tool maintains the predetermined path and/or the predetermined speed and/or the predetermined acceleration when the tool is moved along the additional first movement trajectory 701.

By way of example, the further first movement trajectory 602 can be adapted by means of a spline interpolation. At least one second node 702 is predetermined within the scope of the spline interpolation. By way of example, the at least one second node 702 is chosen in such a way that the tool is moved along the additional first movement trajectory 701 while maintaining the predetermined path and/or the predetermined speed and/or the predetermined acceleration of the apparatus or of the tool. The at least one second node 702 has been chosen in the first configuration space 202 in FIG. 7 in exemplary fashion. However, the second node 702 can also be chosen in a speed space or acceleration space belonging to the first configuration space 202. A speed profile can be represented along the first trajectory 201 in the speed space and an acceleration profile can be represented along said first trajectory in the acceleration space.

After the additional first movement trajectory 701 has been ascertained, an additional second movement trajectory 703 is ascertained by transforming the additional first movement trajectory 701 into the second configuration space 204. This is indicated on the basis of a dashed arrow in FIG. 7. After the additional second movement trajectory 703 has been ascertained, the additional first movement trajectory 701 and/or the additional second movement trajectory 703 are provided to the processor for moving the tool.

In principle, other predetermined boundary conditions to the boundary conditions specified in an exemplary manner in the description may also be checked within the scope of the method. What is important is that at least one boundary condition is checked in the first configuration space 202 and one boundary condition is checked in the second configuration space 204.

In one embodiment of the method, a first partial movement 801 of the tool is set by a first section of the first movement trajectory while a second partial movement 802 of the tool is set by a second section of the second movement trajectory.

Figure 8:
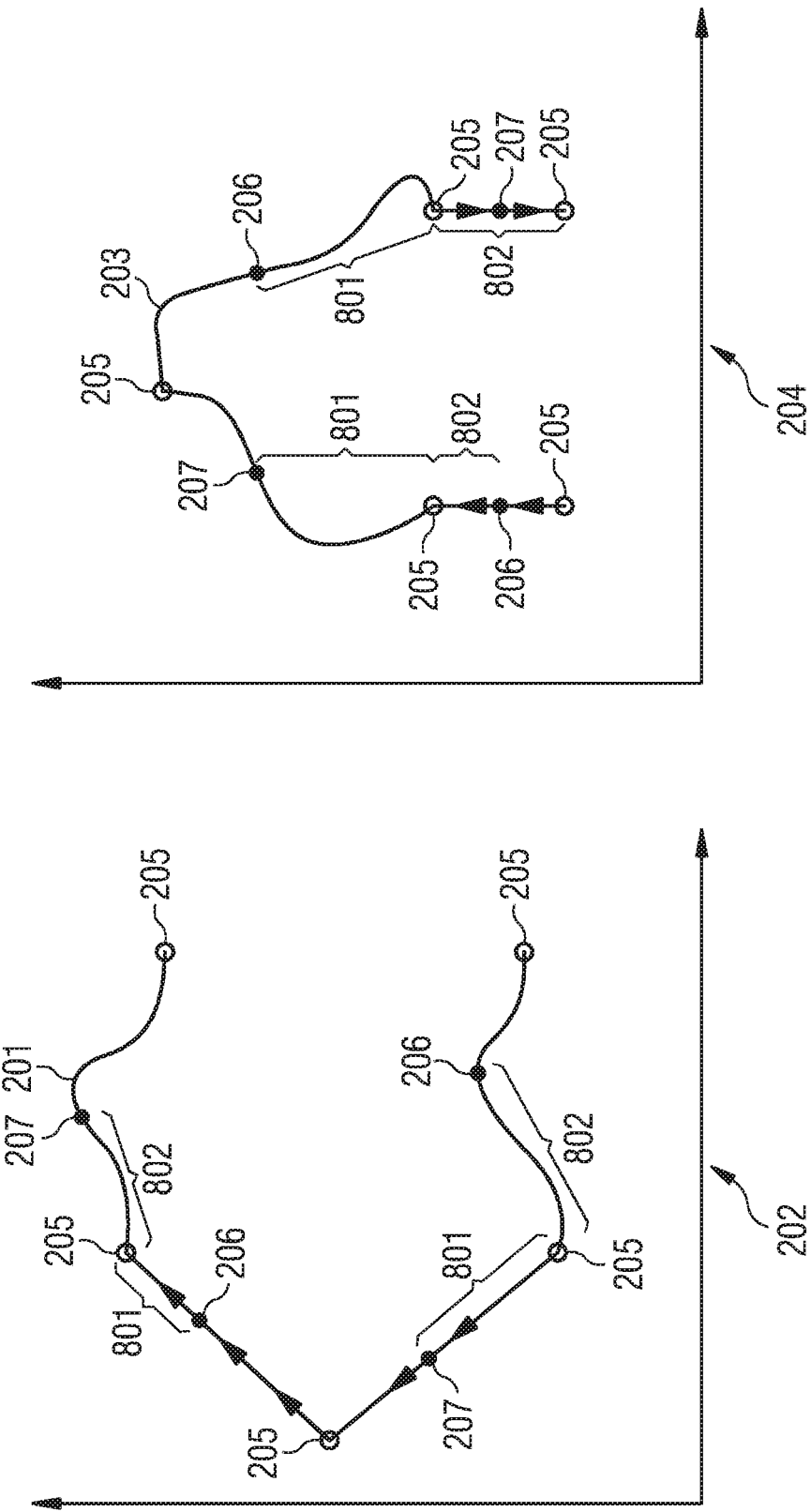
FIG. 8 shows different sections of a movement being set in different configuration spaces.

This is shown in FIG. 8. FIG. 8 shows the predetermined movement that was already shown in FIGS. 3 to 7. Further, FIG. 8 shows possible subdivisions of the movement of the tool into the partial movements 801, 802. Here, two scenarios for subdividing the movement of the tool into respectively the first and the second configuration space 202, 204 are illustrated.

The first trajectory 201 and the second trajectory 203 of the predetermined movement are provided with arrows. One section of the first movement trajectory, which is planned in a region of the first trajectory 201 that is indicated by arrows, is set in the first configuration space 202. A section of the second movement trajectory, which is planned in a region of the second trajectory 203 that is indicated by arrows, is set in the second configuration space 204. Thus, the arrows on the trajectories 201, 203 specify the configuration space 202, 204 in which a partial movement 801, 802 should be set. Setting the partial movements 801, 802 in the respective configuration spaces 202, 204 can also be referred to as programming in the respective configuration spaces 202, 204. The first and the second movement trajectory are not illustrated in FIG. 8. However, the partial movements 801, 802 relate to the first and the second movement trajectory, respectively. The reference signs used for the partial movements 801, 802 in FIG. 8 merely indicate that the partial movements 801, 802 should be carried out in the correspondingly marked regions. Here, the first partial movement 801 should be implemented along the first section of the first movement trajectory and the second partial movement 802 should be implemented along a second section of the second movement trajectory.

It is possible for the first partial movement 801 to be set starting at the initial point 206 of the first movement trajectory and the second partial movement 802 to be set at the end point 207 of the second movement trajectory. This situation is illustrated in FIG. 8 in the upper part of the first configuration space 202 and in the right-hand part of the first configuration space 204. Conversely, it is possible for the second partial movement 802 to be set starting at the initial point 206 of the second movement trajectory and for the first partial movement 801 to be set ending at the end point 207 of the second movement trajectory. This situation is illustrated in FIG. 8 in the lower part of the first configuration space 202 and in the left-hand part of the second configuration space 204. Ascertaining the first movement trajectory thus merely relates to a part of the predetermined movement in the exemplary illustration of FIG. 8. For this reason, two initial points 206 and two end points 207 are respectively illustrated in each configuration space 202, 204 in FIG. 8.

Figure 9:
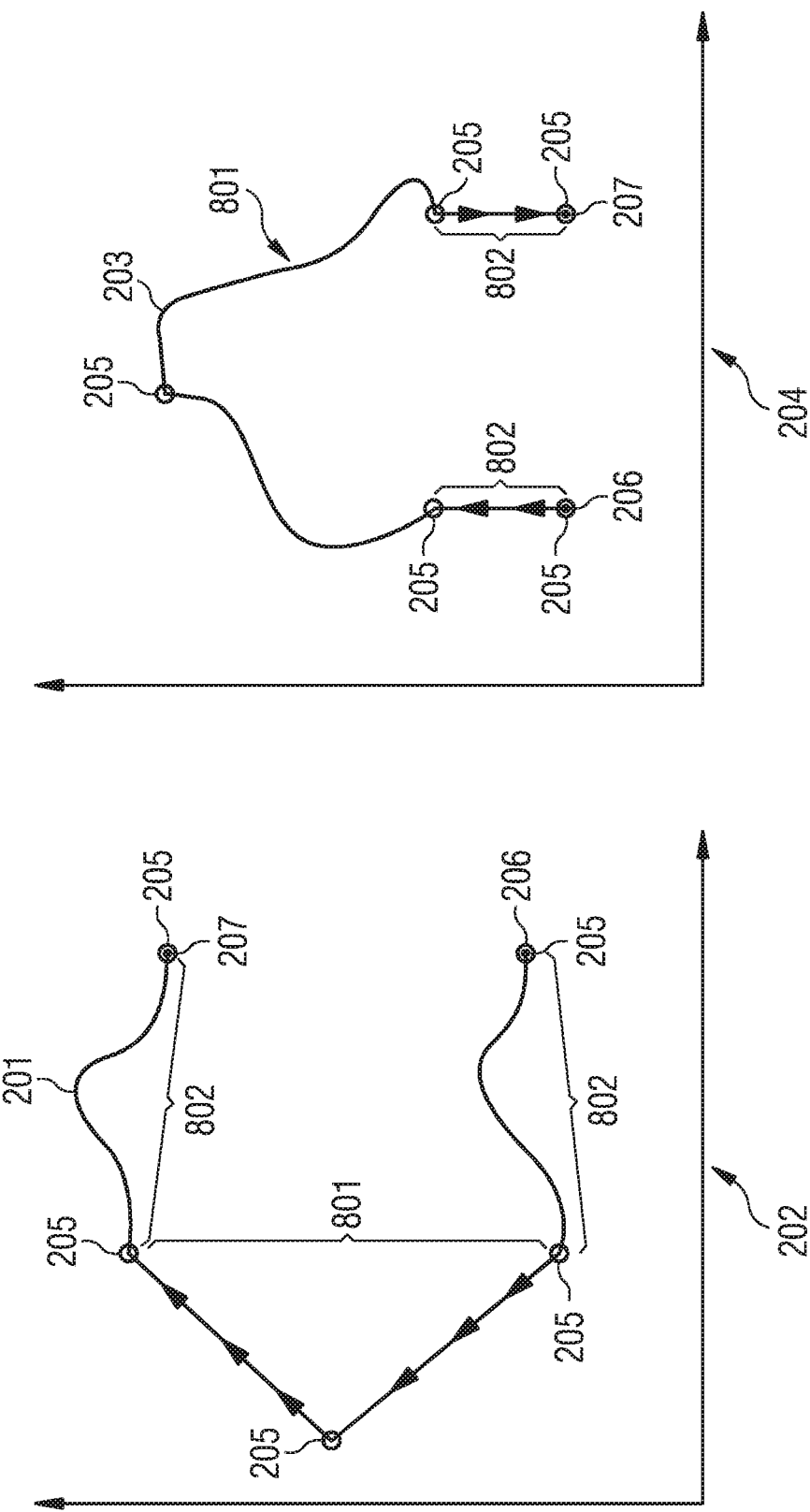
FIG. 9 shows a variant of different sections of a movement being set in different configuration spaces.

A further option for programming is illustrated in FIG. 9. The first movement trajectory and the second movement trajectory are likewise not illustrated in FIG. 9. The reference signs for the partial movements 801, 802 merely indicate that the partial movements 801, 802 should be implemented along the movement trajectories in the correspondingly marked regions.

The further option consists of the second section of the second movement trajectory, i.e., the second partial movement 802, having a first portion and a second portion, with the first section of the first movement trajectory, i.e., the first partial movement 801, being formed between the first portion and the second portion of the second section of the second movement trajectory. Thus, the second partial movement 802 is set starting at the initial point 206 and ending at the end point 207. By way of example, such programming of the movement of the apparatus can be expedient if the tool should initially carry out a process that is described by the second movement 802 in the first portion, should then be moved to a different location in space, which is described by the first movement 801 in the first section, and should then carry out a further process, which is described by the second movement 802 in the second portion.

In exemplary fashion, the initial point 206 and the end point 207 were chosen in such a way that the movement of the apparatus to be planned, i.e., the ascertainment of the first and second movement trajectory, relates to the entire predetermined movement, i.e., the entire first/second trajectory 201, 203. In the earlier description, the movement planning related only to part of the predetermined movement.

In principle, other subdivisions of the movement of the tool into first and second sections with arbitrarily many portions of the sections are also possible, in addition to the subdivisions shown in FIG. 8 and FIG. 9.

Figure 10:
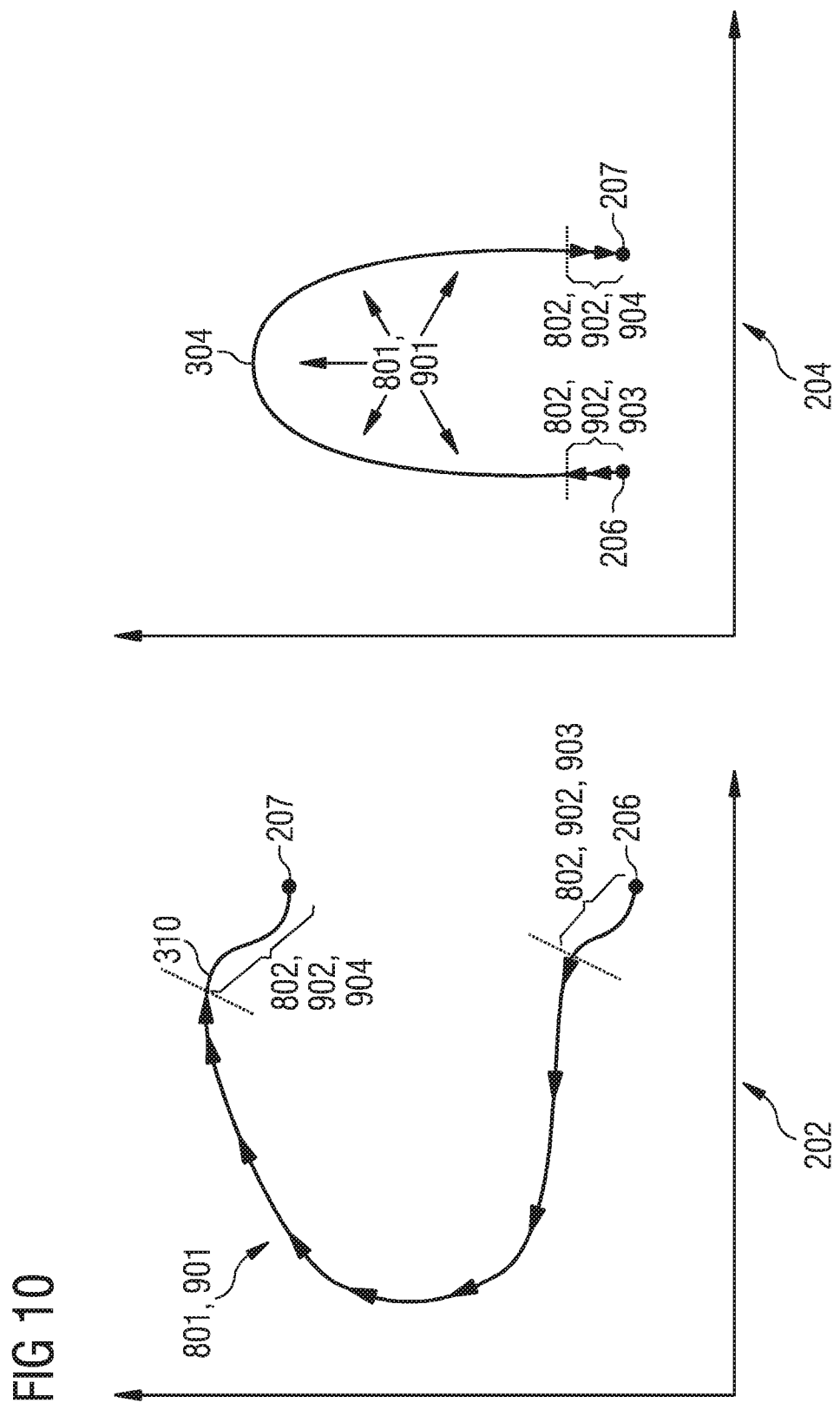
FIG. 10 shows an ascertainment of a first and a second movement trajectory over the first and the second configuration space on the basis of what was set according to the variant shown in FIG. 9.

FIG. 10 shows the ascertained first movement trajectory 301 and the ascertained second movement trajectory 304, which, according to FIG. 9, relate to the entire preliminary movement. Here, this may also relate to a further or additional first and/or second movement trajectory 601, 603, 701, 703, which is ascertained if the predetermined first and/or second boundary condition is initially not satisfied.

In comparison with the first and second trajectory 201, 203 of the preliminary movement (see FIG. 9), the first and the second movement trajectory 301, 304 (see FIG. 10) are smooth; i.e., the first and second movement trajectory 301, 304 have no non-differentiable points at which the speed is undefined and the acceleration is arbitrarily large. Non-differentiable points of a trajectory are distinguished by virtue of forming kinks in the trajectory and the apparatus having to be stopped at these points before it can be moved on.

The first and second trajectory 201, 203 have three kinks. All kinks are no longer present in the first and the second movement trajectory 301, 304. This is due to the fact that planning and ascertaining the movement of the apparatus or of the tool was implemented over both configuration spaces 202, 204. That is to say that, even though the first partial movement 801 is set in the first configuration space 202 and the second partial movement 802 is set in the second configuration space 204, the first and second movement trajectory 301, 304 were planned over both configuration spaces 202, 204 and optimized within the scope of planning. What may be successful in this case is that the apparatus need not be stopped over the entire movement along the first/second movement trajectory 301, 304, even though the first movement 801 is set in the first configuration space and the second movement is set in the second configuration space 204.

It may be expedient to subdivide the movement of the tool into partial movements 801, 802. By way of example, it may be expedient to set the first partial movement 801, in which the tool should be moved in free space without carrying out a process, in the first configuration space 202 if the first partial movement 801 in free space can be formulated more efficiently in the first configuration space 202 than in the second configuration space 204. Conversely, it may be the case that the second partial movement 802, in which the tool should carry out a process, can be formulated more efficiently in the second configuration space 204 than in the first configuration space 202. By way of example, it may be the case that the first partial movement 801 is described by a first section 901 of the first movement trajectory 301 with a straight embodiment in the first configuration space 202 while the second partial movement 802 is described by a curved section of the first movement trajectory 301 in the first configuration space 202. Conversely, it may be the case that the second partial movement 802 is described by a second section 902 of the second movement trajectory 304 with a straight embodiment in the second configuration space 204 while the first partial movement 801 is described by a curved section of the second movement trajectory 304 in the second configuration space 204. What lends itself in this case is to set the movement of the tool in such a way that the partial movements 801, 802 are set by sections of the movement trajectories each with a straight embodiment in the respective configuration spaces.

This is comparable to smoothing from the first to the second partial movement 801, 802. However, in comparison with the point-to-point control, the first movement trajectory need not necessarily deviate from a predetermined transition point between the first and the second section 901, 902 in order to obtain a fluid movement as the first movement trajectory is ascertained, for example, as a spline over the first and second section 901, 902. This spline is continuously differentiable at every point, and so there is no need for active smoothing, in which a smoothing distance is predetermined.

Even though there is no active smoothing in the computer-assisted method for ascertaining the movement of the apparatus, it may be the case that the tool must carry out a process while observing a process tolerance in the second section 902 of the first movement trajectory. This process tolerance must be observed in the transition from the first section 901 to the second section 902. Thus, the process tolerance can be understood to be smoothing distance.

Already known planning approaches do not adopt this strategy of planning over a plurality of configuration spaces 202, 204 when the first partial movement 801 is set in the first configuration space 202 and the second partial movement 802 is set in the second configuration space 204. Rather, the first partial movement 801 is only planned and optimized in the first configuration space 202 and the second partial movement is only planned and optimized in the second configuration space 204.

An advantage over existing methods for ascertaining a movement of an apparatus consists in the fact that the apparatus need not be stopped at a transition from the first partial movement 801 to the second partial movement 802 of the tool if the movement was planned on the basis of the present computer-assisted method for ascertaining the movement of the apparatus. This lies in the fact that the movement is planned in both configuration spaces 202, 204 while observing the predetermined boundary conditions. Previous approaches have the disadvantage that the partial movements 801, 802, which are set in the different configuration spaces 202, 204, are only planned in the corresponding configuration space 202, 204 in each case. By contrast, the entire movement is planned in both configuration spaces 202, 204 in the present method, as a result of which the transition from the first to the second partial movement 801, 802 can be implemented in fluid fashion, i.e., without stopping and at a relatively high speed. Advantageously, this allows the partial movements of the tool to be linked efficiently to one another.

In all exemplary embodiments, the first configuration space 202 can be a coordinate system that relates to at least two translational and/or rotational movement axes of the apparatus while the second configuration space 204 can be a Cartesian coordinate system or a coordinate system with generalized coordinates. However, the first configuration space 202 can also be the Cartesian coordinate system or the coordinate system with generalized coordinates, while the second configuration space 204 can be the coordinate system relating to at least two translational and/or rotational movement axes of the apparatus. By way of example, generalized coordinates can be spherical coordinates or cylindrical coordinates. It should be noted that an obstacle is typically represented in the stationary basis system and that a transformation of a form of an obstacle by means of inverse kinematics is not readily performable.

Figure 11:
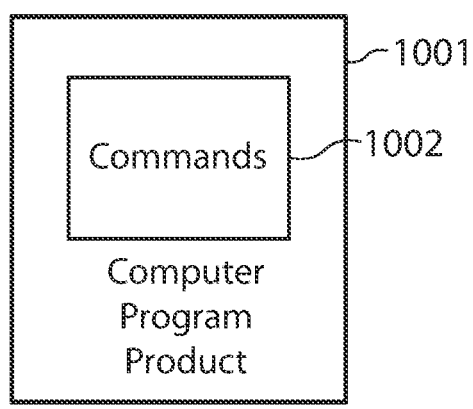
FIG. 11 shows a computer program product for carrying out the method for planning a movement of an apparatus.

FIG. 11 schematically shows a computer program product 1001, comprising commands 1002, wherein the commands 1002 prompt a computer to carry out the method for planning a movement of an apparatus when the computer program is executed by said computer.

Figure 12:
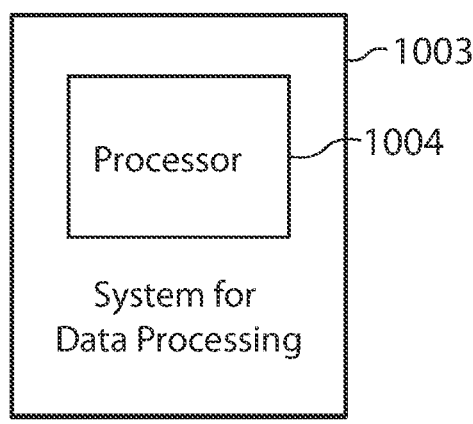
FIG. 12 shows a system for data processing for carrying out the method for planning a movement of an apparatus.

FIG. 12 schematically shows a system for data processing 1003, comprising a processor 1004, wherein the processor 1004 is embodied to carry out the method for planning a movement of an apparatus.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-assisted method for ascertaining a movement of an apparatus,
    wherein the apparatus comprises a tool that is movable by way of translational and/or rotational axes of movement of the apparatus,
    wherein the method includes the following method steps:
        ascertaining a first movement trajectory of the tool in a first configuration space, wherein a predetermined parameter of a movement of the tool is optimized when ascertaining the first movement trajectory,
        checking whether the first movement trajectory satisfies at least one predetermined first boundary condition,
        ascertaining a second movement trajectory of the tool in a second configuration space by transforming the first movement trajectory into the second configuration space when the first movement trajectory satisfies the predetermined first boundary condition,
        checking whether the second movement trajectory satisfies at least one predetermined second boundary condition,
        providing the first movement trajectory and the second movement trajectory for moving the tool when the second movement trajectory satisfies the predetermined second boundary condition, and further wherein
a first partial movement of the tool is set by a first section of the first movement trajectory and
a second partial movement of the tool is set by a second section of the second movement trajectory.

2. The method as claimed in claim 1,
wherein the second section of the second movement trajectory has a first portion and a second portion,
wherein the first section of the first movement trajectory is formed between the first portion and the second portion of the second section of the second movement trajectory.

3. The method as claimed in claim 1,
wherein the first configuration space is a coordinate system relating to at least two translational and/or rotational movement axes of the apparatus,
wherein the second configuration space is a Cartesian coordinate system or a coordinate system with generalized coordinates.

4. The method as claimed in claim 1,
wherein a further first movement trajectory is ascertained in the first configuration space when the first movement trajectory does not satisfy the predetermined first boundary condition,
wherein the predetermined parameter of the movement of the tool is optimized while observing the predetermined first boundary condition when ascertaining the further first movement trajectory.

5. The method as claimed in claim 4,
wherein ascertaining the further first movement trajectory is implemented in such a way that the apparatus is moved around an obstacle when moving the tool along the further first movement trajectory.

6. The method as claimed in claim 5,
wherein ascertaining the further first movement trajectory is implemented by means of a spline interpolation,
wherein at least one first node is predetermined within the scope of the spline interpolation,
wherein the first node is chosen in such a way that the apparatus is moved around the obstacle when moving the tool along the further first movement trajectory.

7. The method as claimed in claim 1,
wherein a check as to whether the tool is moved along the first movement trajectory in such a way that the apparatus is moved in collision-free fashion is carried out when checking whether the first movement trajectory satisfies the predetermined first boundary condition.

8. The method as claimed in claim 1,
wherein an additional first movement trajectory is ascertained in the first configuration space when the second movement trajectory does not satisfy the predetermined second boundary condition,
wherein the predetermined parameter of the movement of the tool is optimized while observing the predetermined second boundary condition when ascertaining the additional first movement trajectory.

9. The method as claimed in claim 8,
wherein the additional first movement trajectory is ascertained by adapting the first movement trajectory,
wherein the first movement trajectory is adapted in such a way that the predetermined process tolerance is observed when moving the tool along the additional first movement trajectory.

10. The method as claimed in claim 1,
wherein a check as to whether the tool is moved along the second movement trajectory in such a way that a predetermined process tolerance is observed is carried out when checking whether the second movement trajectory satisfies the predetermined second boundary condition.

11. The method as claimed in claim 10,
wherein a check as to whether a predetermined path and/or a predetermined speed and/or a predetermined acceleration of the apparatus or of the tool are maintained is carried out when checking whether the tool is moved along the second movement trajectory in such a way that the predetermined process tolerance is observed.

12. The method as claimed in claim 11,
wherein the first movement trajectory is adapted in such a way that the apparatus or the tool maintains the predetermined path and/or the predetermined speed and/or the predetermined acceleration when moving the tool along the additional first movement trajectory.

13. The method as claimed in claim 12,
wherein the first movement trajectory is adapted by means of a spline interpolation,
wherein at least one second node is predetermined within the scope of the spline interpolation,
wherein the second node is chosen in such a way that the tool is moved along the additional first movement trajectory while maintaining the predetermined path and/or the predetermined speed and/or the predetermined acceleration of the apparatus or of the tool.

14. The method as claimed in claim 1,
wherein movement means of the tool are actuated by a processor in such a way that the tool is moved along the first and/or second movement trajectory.

15. A computer program product, comprising a computer readable hardware storage device having computer readable program code stored therein, said program code executable by a processor of a computer system to implement a method for ascertaining a movement of an apparatus, wherein the apparatus comprises a tool that is movable by way of translational and/or rotational axes of movement of the apparatus when said computer executes the computer program,
wherein the method includes:
ascertaining a first movement trajectory of the tool in a first configuration space, wherein a predetermined parameter of a movement of the tool is optimized when ascertaining the first movement trajectory,
checking whether the first movement trajectory satisfies at least one predetermined first boundary condition,
ascertaining a second movement trajectory of the tool in a second configuration space by transforming the first movement trajectory into the second configuration space when the first movement trajectory satisfies the predetermined first boundary condition,
checking whether the second movement trajectory satisfies at least one predetermined second boundary condition,
providing the first movement trajectory and the second movement trajectory for moving the tool when the second movement trajectory satisfies the predetermined second boundary condition, and
wherein
a first partial movement of the tool is set by a first section of the first movement trajectory and
a second partial movement of the tool is set by a second section of the second movement trajectory.

16. A system for data processing, comprising:
a processor, wherein the processor is configured to:

ascertain a first movement trajectory of a tool in a first configuration space, wherein a predetermined parameter of a movement of the tool is optimized when ascertaining the first movement trajectory, check whether the first movement trajectory satisfies at least one predetermined first boundary condition, ascertain a second movement trajectory of the tool in a second configuration space by transforming the first movement trajectory into the second configuration space when the first movement trajectory satisfies the predetermined first boundary condition, check whether the second movement trajectory satisfies at least one predetermined second boundary condition, provide the first movement trajectory and the second movement trajectory for moving the tool when the second movement trajectory satisfies the predetermined second boundary condition, and wherein a first partial movement of the tool is set by a first section of the first movement trajectory and a second partial movement of the tool is set by a second section of the second movement trajectory.

\* \* \* \* \*